United States Patent Office 2,713,591
Patented July 19, 1955

2,713,591

PREPARATION OF ORGANIC ISOCYANATES

Newman M. Bortnick, Oreland, Pa., assignor to Rohm & Haas Company, Philadelphia, Pa., a corporation of Delaware No Drawing. Application September 25, 1952,
Serial No. 311,537

8 Claims. (Cl. 260—453)

This invention relates to the preparation of organic isocyanates which have the general formula R—NCO, in which R represents a secondary or tertiary hydrocarbon group which is free of olefinic or acetylenic unsaturation.

An object is to produce said isocyanates cheaply and efficiently from carbamates. And this object is realized by the process of this invention which comprises pyrolyzing a carbamate, which is described in detail below, in the presence of a basic catalyst such as the water-soluble metal hydroxides or alkoxides or the water-insoluble oxides or hydroxides of the heavy metals. The pyrolysis can be carried out in several ways, such as by passing the vapors of the carbamate through a tube containing the basic compound. In the preferred embodiment of this process, however, a carbamate is heated at its boiling point in the presence of the basic compound and is decomposed into an isocyanate which is removed and recovered by distillation. Following is a representation of the course of the reaction:

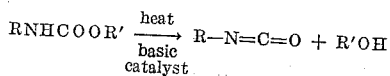

in which R has the significance described above and R' is a hydrocarbon group, preferably a lower alkyl group such as a methyl, ethyl, or isopropyl group.

It has been proposed heretofore to convert carbamates which have a primary alkyl group such as a n-butyl or a n-dodecyl group attached to the nitrogen atom into the corresponding isocyanates by a simple process of heating. And while this method, as described for example in U. S. Patent No. 2,409,712, is suitable for the production of isocyanates, RNCO, in which R is a primary alkyl group, it is inadequate for the production of isocyanates in which R is a secondary or tertiary hydrocarbon group because the carbamates containing these two kinds of groups are surprisingly stable towards heat alone and can actually be distilled without decomposition. It is only when a basic compound is present that these kinds of carbamates decompose to form isocyanates in a practical manner. On the other hand, the conversion by heat of carbamates containing primary hydrocarbon groups appears to be deleteriously affected by the presence of a strongly basic compound with the result that the yield of isocyanate is reduced and the quantity of undesirable by-products is increased.

The carbamates which are converted to isocyanates by the improved process of this invention are only those in which the carbon atom attached to the nitrogen atom is also attached to two or three more carbon atoms, so that the entire group represented by R is a secondary or tertiary hydrocarbon group. Typical of the reactive and convertible carbamates are those having the general formula R—NHCOOR' in which R is a group such as one of the following radicals: Isopropyl, sec.-butyl, tert.-butyl, sec.-amyl, tert.-amyl, cyclohexyl, 1-methylcyclopentyl, 1-ethylcyclohexyl, 1-propylcyclohexyl, sec.-octyl, tert.-octyl, tert.-octadecyl, dimethylneopentylcarbinyl of the formula

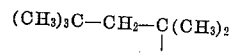

2-phenylisopropyl, ethyldioctylcarbinyl of the formula

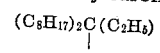

and the like including isomeric secondary and tertiary groups having up to and including 24 carbon atoms. Obviously the group which is represented by R must contain at least three carbon atoms.

Another way of describing the carbamates and the isocyanates is to point out that all of them contain on the nitrogen atom of the carbamate grouping and the isocyanate grouping the molecular configuration

In this configuration $R^2$ and $R^3$ represent individual monovalent hydrocarbon radicals which are free of non-benzenoid unsaturation and which are preferably alkyl groups; $R^4$ represents either a hydrogen atom or a monovalent hydrocarbon radical which is also free of non-benzenoid unsaturation and which preferably is also an alkyl group. In addition, $R^2$ and $R^3$ taken together with the carbon atom $C_1$ represent a cyclic aliphatic radical, to one and the same carbon atom of which are attached the nitrogen atom of the carbamate or isocyanate grouping and also group $R^4$. That is to say, $R^2$ and $R^3$, in addition to representing individual monovalent hydrocarbon radicals, represent an alkylene group—preferably a polymethylene group of four or five carbon atoms—when taken together. The terminal atoms of the alkylene group are both attached to the secondary or tertiary carbon atom $C_1$ which is attached to the nitrogen atom and also carries group $R^4$.

Mixtures of carbamates, particularly mixtures of isomeric carbamates, can be converted to corresponding mixtures of isocyanates, provided that the group which is attached to the nitrogen atom is a secondary or tertiary group. It is to be noted that the group which is attached to the carbamate grouping and which is represented by R in the first general formula above remains intact during the reaction and that decomposition takes place only in the remaining portion of the carbamate molecule.

The group which is represented by R' in the above general formula can be virtually any kind of a hydrocarbon group which is free of non-benzenoid unsaturation: aliphatic such as methyl or ethyl groups, alicyclic such as cyclohexyl, or aromatic such as benzyl. Since, however, this group ultimately forms the alcohol R'OH, it is much preferred that it be a simple lower alkyl group such as a methyl, ethyl, propyl, or butyl group so that the alcohol R'OH which is formed together with the isocyanate can be easily separated from the latter by distillation.

The compound which is employed to accelerate the pyrolysis must contain a metal and must be basic. It can be a water-soluble or a water-insoluble, basic, metallic compound. If it is of the water-soluble type, it must be at least as basic as sodium acetate. This is to say, it must be so basic that its 0.1 N aqueous solution has a pH of at least 8, and preferably from 10 to 13, at 25° C. Included in this category are the oxides, hydroxides, and alkoxides of the alkali metals, such as sodium hydroxide, sodium methoxide, lithium oxide, potassium ethoxide, and the like, as well as the salts of the alkali metals and weak acids, especially the salts of aliphatic carboxylic acids, exemplified by sodium acetate, potassium carbonate, and lithium bicarbonate. Alkali metals; e. g., sodium and potassium, can also be used, especially since they react with the alcohols formed in the process to yield alkoxides, already noted as being among the best catalysts for use in this process. Oxides and hydroxides of the alkaline earth metals are likewise operable as typified by lime, zinc oxide, magnesium oxide, barium hydroxide, strontium hydroxide, et cetera. Finally, the oxides and hydroxides of the heavy metals can be and have been used successfully such as the oxides and hydroxides of cadmium, manganese, lead, mercury, aluminum, iron, nickel, cobalt, cerium, copper, and tin. What is required is that the catalyst be basic in the accepted sense that it forms hydroxyl ions in water or is capable of neutralizing a strong mineral acid such as hydrochloric acid or sulfuric acid.

It is recommended that from about 2% to 15% of the basic compound based on the weight of the carbamate be used at the outset. These amounts, however, are not critical as is evident from the fact that the concentration of necessity increases as the isocyanate is removed from the reactor during the progress of the reaction.

In the preferred embodiment of this invention, the carbamate and the basic catalyst are heated together to boiling and the products, an isocyanate and an alcohol, are distilled from the reaction mixture. In the case of high boiling carbamates it is recommended that the pyrolysis be carried out under reduced pressure.

The following examples, in which all parts are by weight, serve to illustrate the nature and advantages of the process.

Example 1

A mixture of 20 parts of ethyl N-tert.-octylcarbamate (t—$C_8H_{17}$—$NHCOOC_2H_5$) and one part of sodium methoxide was heated to boiling in a flask equipped with thermometers and a fractionating column. When the pot temperature rose to 190° C., the head temperature was 78° C. The following fractions were isolated:

Fraction I: B. P. 78°–90° C.; $n_D^{20}$–1.364; 4.5 parts of ethanol

Fraction II: B. P. 90°–155° C.; $n_D^{20}$–1.401; 3.0 parts of a mixture of ethanol and t-octylisocyanate Fraction III: B. P. up to 175° C.; $n_D^{20}$–1.429; 9.3 parts of practically pure tert.-octylisocyanate. This represents a yield of 59%.

Example 2

In a similar manner a mixture of 100 parts of ethyl N-tert.-octylcarbamate (t—$C_8H_{17}NHCOOC_2H_5$) and 5 parts of lime was heated to 195°–200° C. in a flask equipped with a stirrer, thermometer, and fractionating column. Approximately 25 parts of ethanol was removed after which there was collected 57 parts (74% yield) of tert.-octylisocyanate boiling at 165°–167° C.

Example 3

Twenty parts of ethyl N-tert.-octylcarbamate alone was heated in the same equipment as was employed in Example 1 above. The contents was refluxed for two hours without evidence of decomposition. The material was cooled to room temperature and was treated with one part of lime. On reheating, the pot temperature rose to 215° C. and the entire contents of the flask distilled below 170° C. at atmospheric pressure. The distillate was dissolved in benzene, was washed four times with water, dried over anhydrous magnesium sulfate and redistilled. A 79% yield of N-tert.-octylisocyanate was thus obtained. Its composition was confirmed by analysis.

Example 4

Fifty parts of methyl N-tert.-butylcarbamate was distilled in the presence of four parts of potassium methoxide. The distillate, which was collected at a temperature up to 100° C., was carefully fractionated and a 70% yield of tert.-butylisocyanate (B. P. 87°–88° C.) was thus obtained.

Example 5

Forty parts of methyl N-isopropylcarbamate was distilled in the presence of four parts of sodium methoxide. All of the distillate which boiled below 100° C. was collected in an ice-cooled receiver. The distillate was dissoved in diethyl ether and the resultant solution was thoroughly washed with ice-water, dried over anhydrous magnesium sulfate, and carefully fractionated. A 45% yield of isopropyl isocyanate was thus obtained. A residue of six parts of a trimeric product, triisopropyl isocyanurate, was also obtained.

When the sodium methoxide was replaced by lime in a repetition of the above example, a 75% yield of isopropyl isocyanate was obtained.

Example 6

One hundred parts of methyl N-methylcarbamate was boiled together with five parts of sodium methoxide in a flask equipped with thermometers and fractionating column. The pot temperature rose gradually from 158° C. to 270° C. during which time a distillate consisting solely of methanol was obtained. At 270°–285° C. and atmospheric pressure a 75% yield of cyclic trimethyl isocyanurate was formed. This material had a melting point of 173°–176° C. as obtained directly from the distillate. No trace of methyl isocyanate or N-N'-dimethylurea was detected.

In a similar attempt only triethyl isocyanurate was obtained from methyl N-ethylcarbamate.

Example 7

Twenty parts of methyl N-n-butylcarbamate was distilled in the presence of two parts of sodium methoxide and the distillate which boiled below 125° C. (at a pot temperature of 150°–195° C.) was collected in an ice-cooled receiver. From this distillate was obtained n-butyl isocyanate in only a 12% yield.

Example 8

Fifty parts of ethyl N-(1-methylcyclohexyl)carbamate was distilled in the presence of two parts of powdered potassium hydroxide. The distillate was fractionated to give an 80% yield of 1-methylcyclohexyl isocyanate,

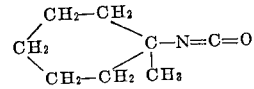

Example 9

Forty parts of a mixture of N-octadecyl-substituted ethyl carbamates in which the octadecyl groups were secondary and tertiary radicals was distilled under reduced pressure in the presence of 0.4 part of metallic potassium. A 95% yield of the isomeric secondary- and tertiary-octadecyl isocyanates was obtained.

Essentially the same results were obtained when 0.7 part of potassium hydroxide or 2 parts of potassium octoxide was substituted for the metallic potassium. In the absence of a basic catalytic compound, however, the isomeric carbamates distill unchanged at reduced pressures. At normal pressure they decompose to compounds other than isocyanates.

Example 10

Forty parts of ethyl N-(phenyldimethylcarbinyl)-carbamate, $C_6H_5$—$C(CH_3)_2$—$NHCOOC_2H_5$, was distilled in the presence of 5 parts of lime at atmospheric pressure. Simple fractionation of the distillate gave an 83% yield of phenyldimethylcarbinyl isocyanate.

Example 11

Forty parts of methyl N-(phenylmethylcarbinyl)-carbamate was distilled at atmospheric pressure in the presence of 5 parts of lime. The distillate was collected in an ice-cooled receiver, was taken up in ligroin, washed thoroughly with water, dried over anhydrous magnesium sulfate, and finally was redistilled under reduced pressure. A 75% yield of phenylmethylcarbinyl isocyanate was obtained.

The same procedure was followed using ethyl N-cyclohexyl-carbamate, and a 62% yield of cyclohexyl isocyanate was recovered.

When ethyl N-(2-octyl)-carbamate was distilled in the same way, a 68% yield of 2-octyl isocyanate resulted.

*Example 12*

Ten parts of ethyl N-tert.-octylcarbamate was placed in a distillation flask with one part of cadmium oxide. The flask was heated rapidly and all of the liquid was distilled over a period of 20 minutes. The amount of tert.-octyl isocyanate in the distillate was determined by analysis and was found to be 81%.

Other metallic oxides were substituted for the cadmium oxide in the above procedure. Following are listed the percentages of conversion of ethyl N-tert.-octylcarbamate to tert.-octyl isocyanate by pyrolysis of the former in the presence of the metallic oxides: $MnO_2$, 45%; PbO, 20%; $Al_2O_3$, 22%; $CeO_2$, 55%; ZnO, 72%; $Cu_2O$, 35%; and NiO, 37%.

By the same procedure a 66% conversion was obtained by the use of sodium acetate. But no conversion took place when the carbamate was distilled in the absence of a basic catalyst.

It should be noted that the percentages above represent the amount of conversion—not the yield—since in every case some of the carbamate distilled over unchanged and could be recovered and reused.

I claim:

1. A process for the preparation of an organic isocyanate having the general formula

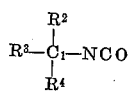

in which $R^2$ and $R^3$ represent monovalent hydrocarbon groups which are free of non-benzenoid unsaturation, $R^4$ represents a member of the class consisting of a hydrogen atom and an alkyl group, and in addition $R^2$ and $R^3$ taken together with carbon atom $C_1$ represent a cycloaliphatic radical which carries the group $R^4$ on the same carbon atom as is joined to the isocyanate group, —NCO, which process comprises pyrolyzing, in the presence of a basic catalyst, which is a member of the class consisting of (a) water-soluble metallic compounds of such basic strength that their 0.1 N aqueous solutions have a pH of at least 8 at 25° C. and (b) water-insoluble oxides and hydroxides of the heavy metals, a carbamate having the general formula

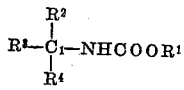

in which the characters of $R^2$, $R^3$, $R^4$ and $C_1$ have the same significance as in the first general formula above and $R^1$ is a monovalent hydrocarbon radical which is free of non-benzenoid unsaturation, and isolating said isocyanate by distillation from the mixture of said carbamate and said basic compound.

2. A process for the preparation of an organic isocyanate having the formula RNCO in which R is a secondary alkyl group which comprises boiling a mixture of a basic catalyst, which is a member of the class consisting of (a) water-soluble metallic compounds of such basic strength that their 0.1 N aqueous solutions have a pH of at least 8 at 25° C. and (b) water-insoluble oxides and hydroxides of the heavy metals, and a carbamate having the formula R—NHCOOR¹ in which R is identical with the same character in the first formula above and $R^1$ is a lower alkyl group and distilling said isocyanate from said mixture.

3. A process for the preparation of an organic isocyanate having the formula RNCO in which R is a tertiary alkyl group which comprises boiling a mixture of a basic catalyst, which is a member of the class consisting of (a) water-soluble metallic compounds of such basic strength that their 0.1 N aqueous solutions have a pH of at least 8 at 25° C. and (b) water-insoluble oxides and hydroxides of the heavy metals, and a carbamate having the formula R—NHCOOR¹ in which R is identical with the same character in the first formula above and $R^1$ is a lower alkyl group and distilling said isocyanate from said mixture.

4. A process for the preparation of tert.-butyl isocyanate which comprises boiling a mixture of a basic catalyst, which is a member of the class consisting of (a) water-soluble metallic compounds of such basic strength that their 0.1 N aqueous solutions have a pH of at least 8 at 25° C. and (b) water-insoluble oxides and hydroxides of the heavy metals, and a carbamate of the formula $(CH_3)_3C$—NHCOOR¹ in which $R^1$ is a lower alkyl group and distilling tert.-butyl isocyanate from said mixture.

5. A process for the preparation of tert.-octyl isocyanate which comprises boiling a mixture of a basic catalyst, which is a member of the class consisting of (a) water-soluble metallic compounds of such basic strength that their 0.1 N aqueous solutions have a pH of at least 8 at 25° C. and (b) water-insoluble oxides and hydroxides of the heavy metals, and a carbamate of the formula tert.-$C_8H_{17}$—NHCOOR¹ in which $R^1$ is a lower alkyl group and distilling tert.-octyl isocyanate from said mixture.

6. A process for the preparation of tert.-octadecyl isocyanate which comprises boiling under reduced pressure a mixture of a basic catalyst, which is a member of the class consisting of (a) water-soluble metallic compounds of such basic strength that their 0.1 N aqueous solutions have a pH of at least 8 at 25° C. and (b) water-insoluble oxides and hydroxides of the heavy metals, and a carbamate of the formula tert.-$C_{18}H_{37}$—NHCOOR¹ in which $R^1$ is a lower alkyl group and distilling tert.-octadecyl isocyanate from said mixture.

7. A process for the preparation of 2-octyl isocyanate which comprises boiling a mixture of a basic catalyst, which is a member of the class consisting of (a) water-soluble metallic compounds of such basic strength that their 0.1 N aqueous solutions have a pH of at least 8 at 25° C. and (b) water-insoluble oxides and hydroxides of the heavy metals, and a carbamate of the formula

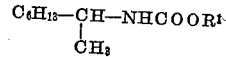

in which $R^1$ is a lower alkyl group and distilling 2-octyl isocyanate from said mixture.

8. A process for the preparation of cyclohexyl isocyanate which comprises boiling a mixture of a basic catalyst, which is a member of the class consisting of (a) water-soluble metallic compounds of such basic strength that their 0.1 N aqueous solutions have a pH of at least 8 at 25° C. and (b) water-insoluble oxides and hydroxides of the heavy metals, and a carbamate of the formula

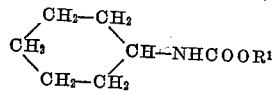

in which $R^1$ is a lower alkyl group and distilling cyclohexyl isocyanate from said mixture.

References Cited in the file of this patent

UNITED STATES PATENTS 2,409,712   Schweitzer _____ Oct. 22, 1946